Figure 2A:
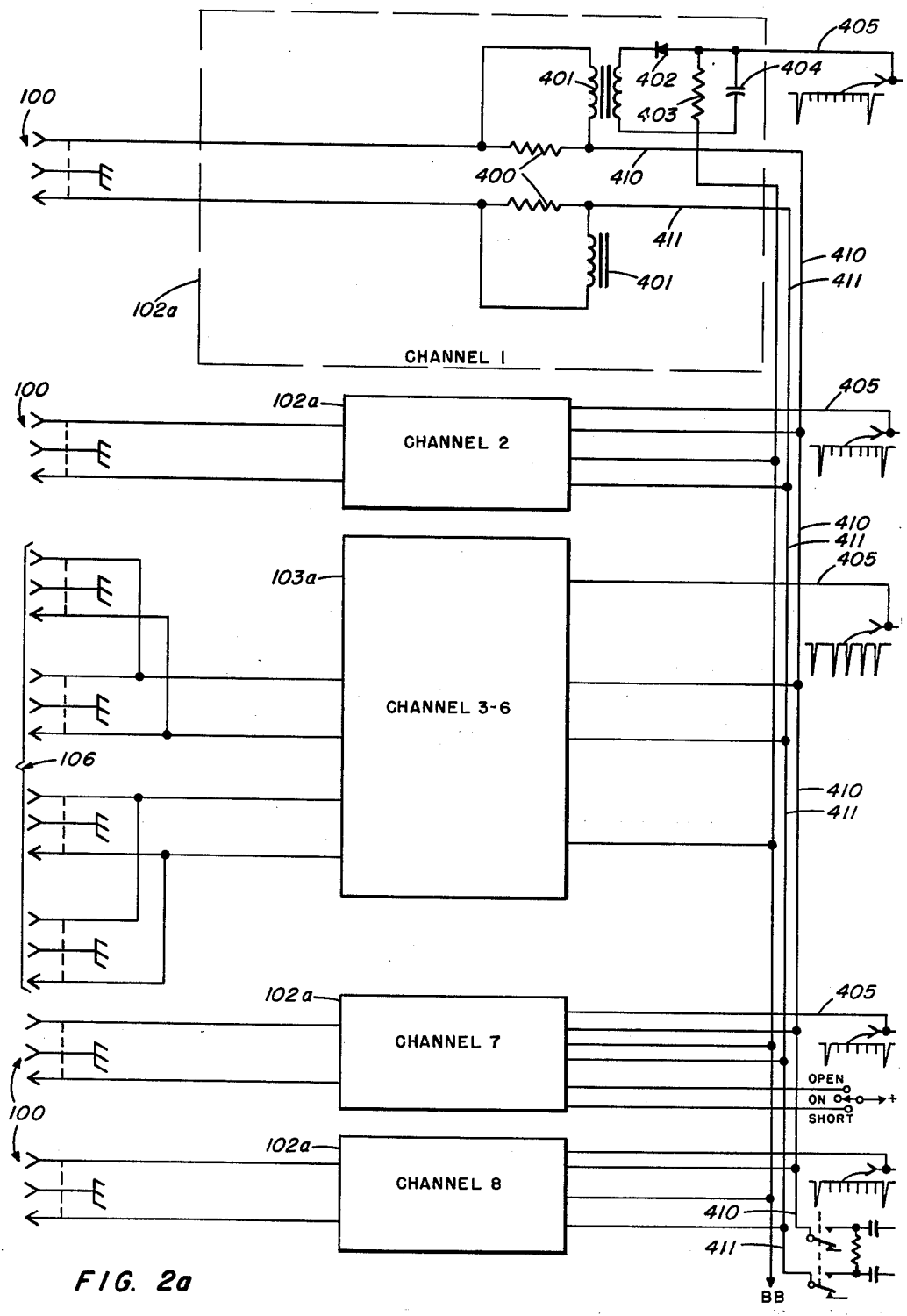

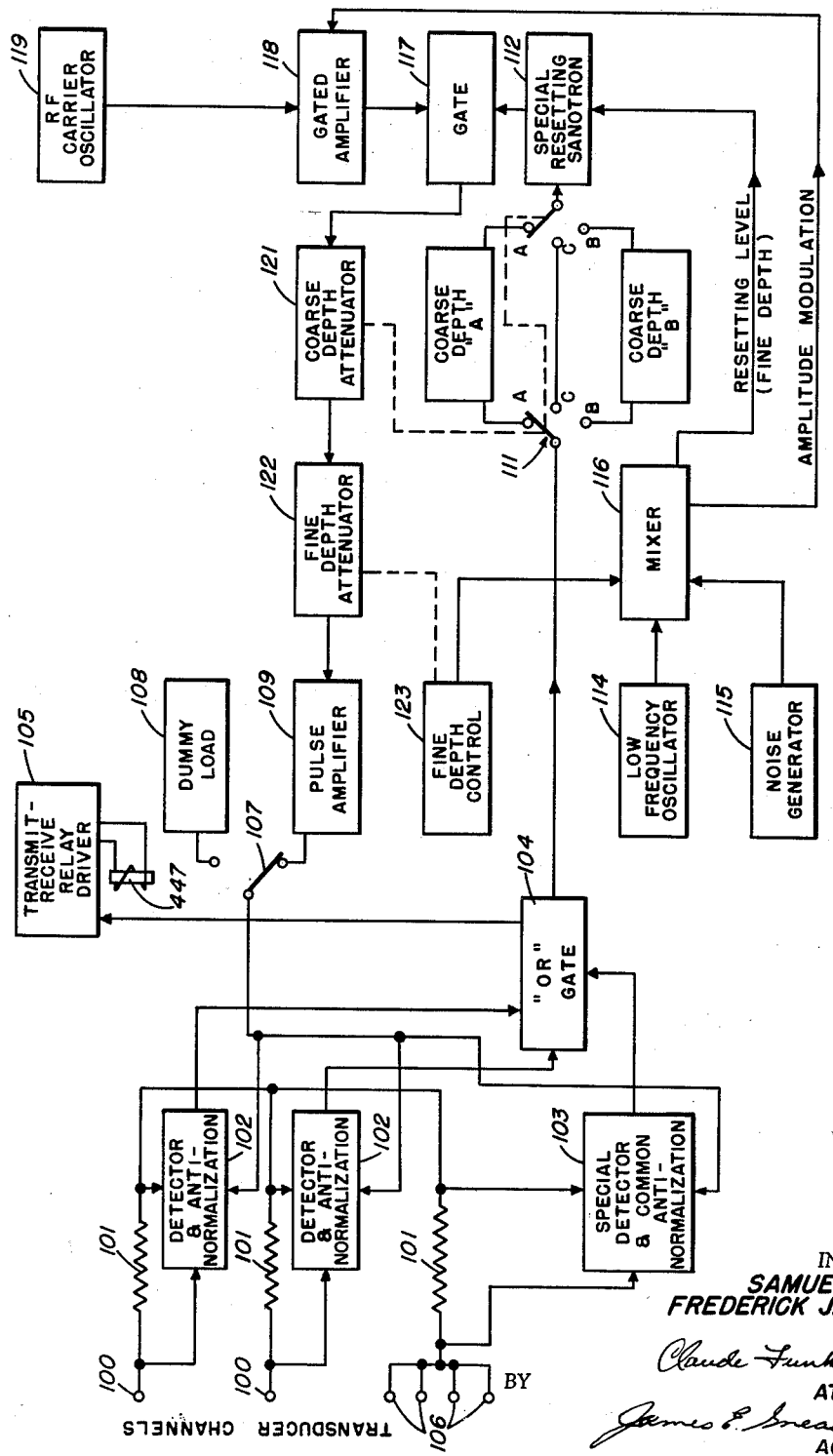

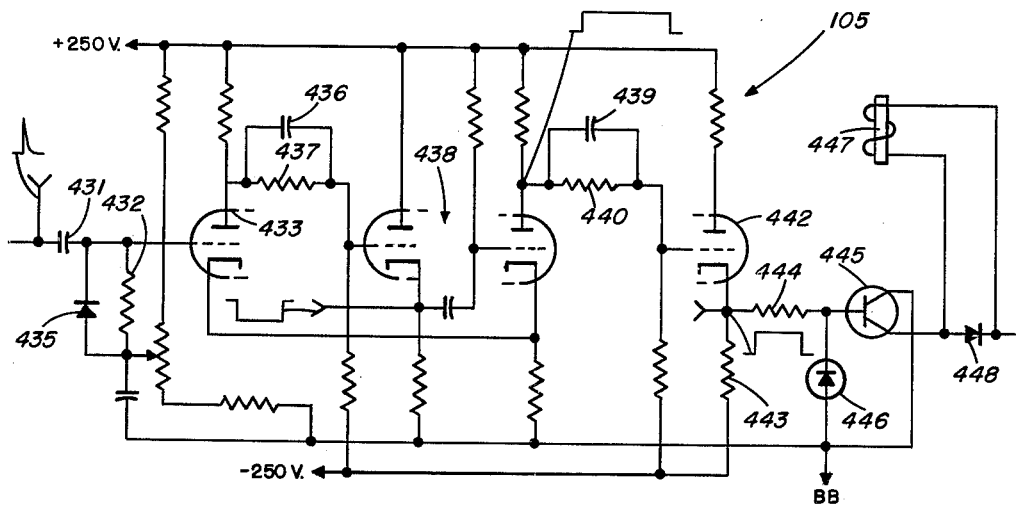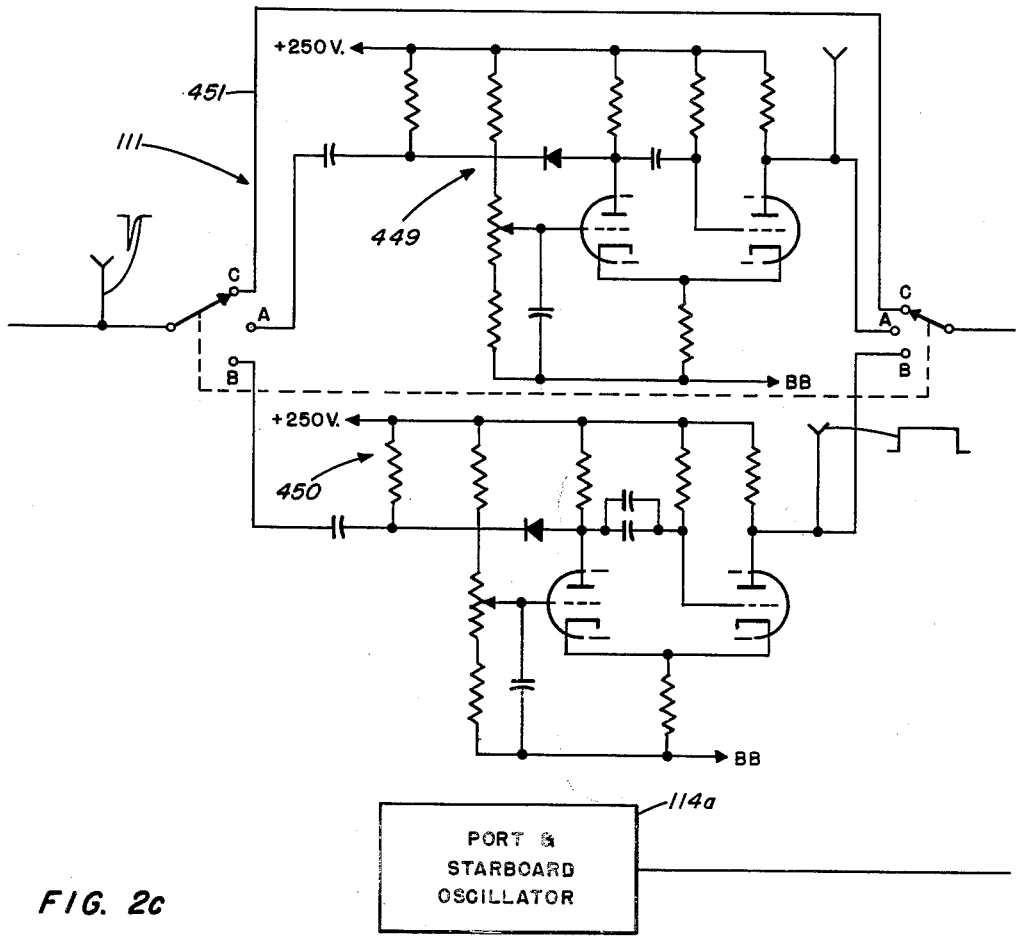
FIG. 2c

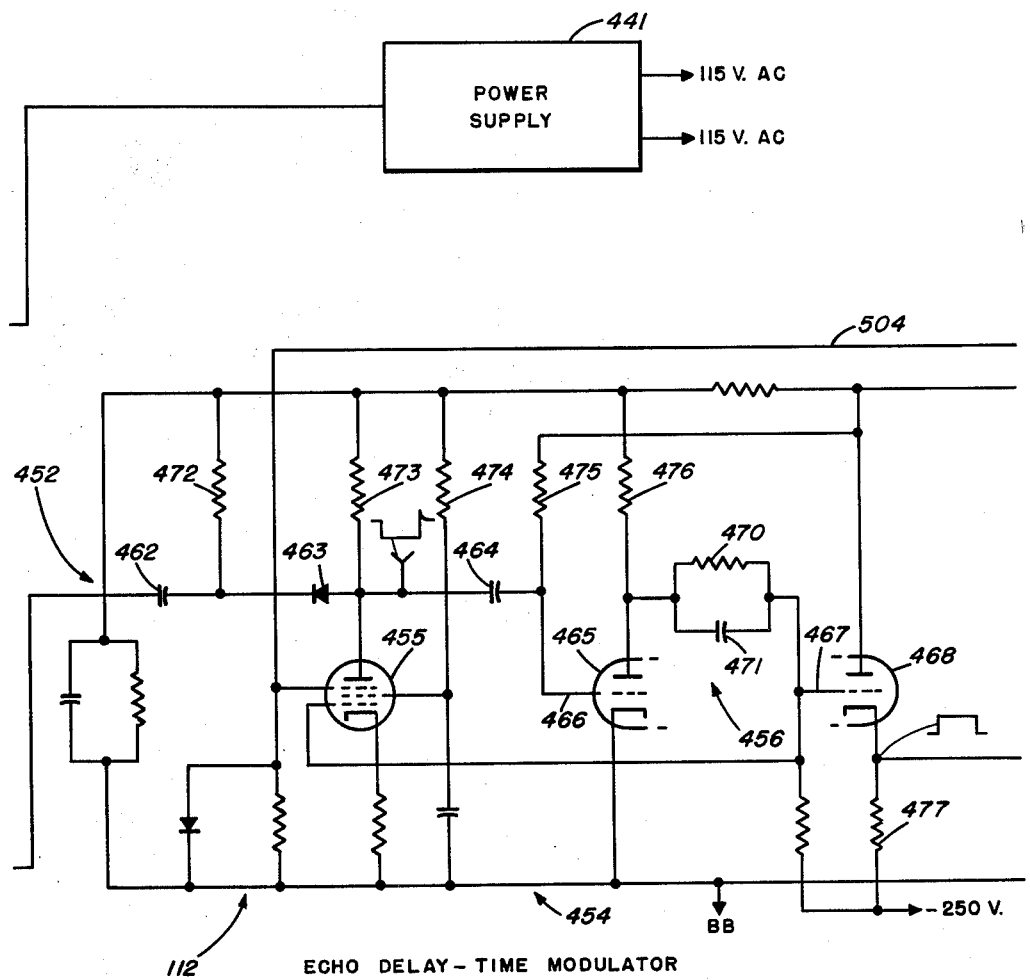
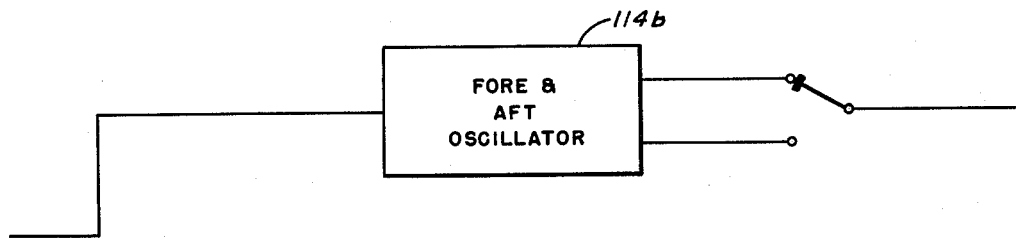
FIG. 2d

3,196,199
MULTI-CHANNEL TRANSPONDER
Samuel Wolf, Linthicum Heights, and Frederick J. Conrad, Baltimore, Md., assignors, by mesne assignments, to the United States of America as represented by the Secretary of the Navy
Filed Apr. 22, 1963, Ser. No. 274,875
14 Claims. (Cl. 35—10.4)

The present invention relates to a system for simulating certain water characteristics to be utilized as information in a computer for determining such things as underwater launch correction factors for missiles.

In general, devices have been provided in the prior art for determining the characteristics of variable conditions of water, such as its depth, prior to launching of a missile therefrom. Typical prior art devices for determining the state of water and of objects in the water are generally referred to as sonar systems. In order to effectively train operators of these various devices, it is desirable to provide a system to inject controlled hypothetical information indicating varying conditions into the computing device so that a student operator can be trained under varying conditions. It is further desirable that the information controlling system be located outside of the actual working conditions under which a normal system would operate in order that a convenient teaching facility may be provided.

Systems have been provided in the prior art for simulating detected objects in typical sonar applications. However, a need has arisen for a simulation device for training purposes in the newly developed underwater missile launch technology. Such a device should be able to simulate hypothetical conditions to which the various sensors for determining water characteristics will be subjected.

Therefore, it is an object of the present invention to provide a system for simulating water depth and surface characteristics in a hypothetical underwater missile launch situation.

It is a further object of the present invention to provide a transponder system for providing hypothetical water depth and wave motion data to a plurality of transducers in connection with water condition sensing means.

Another object of the present invention is to provide a transponder system having a plurality of inputs and outputs for receiving interrogating signals and transmitting hypothetical depth and wave motion echo signals to a water characteristics computation system.

Still another object of the present invention is to provide a transponder system having a plurality of inputs adapted to be energized in sequence and adapted to eliminate cross-talk between parallel inputs.

A further object of the present invention is to provide a transponder system having a plurality of inputs which are designed to simulate transducer channels in a water characteristic measuring system, are connected electrically to an echo simulating circuit, and are energized in sequence to provide hypothetical water characteristic depth and wave motion indication to a water condition sensing system.

Still another object of the present invention is to provide a transponder system having a plurality of input channels connecting a water characteristic computer to a water depth simulating system which is designed to provide simulated echo pulses which may be varied to indicate varying water depths and surface wave motion.

The present invention is designed to provide a transponder system for simulating echo pulses fed into a water condition sensing system, such as that used in underwater missile launch operation, whereby a plurality of transducers located, hypothetically, along the surface of a submarine are energized in sequence to transmit and receive echo pulses indicative of water depth and wave motion. The present system relates only to the water depth transponder system and is designed to provide an operator with water depth information which is variable for varying hypothetical conditions. The transponder system is designed to receive interrogating pulses from a separate water condition computer in sequence in each of several inputs which are designed to simulate transducers located on a submarine. These simulated transducers operate, in sequence, to interrogate an echo pulse simulating system which in turn provides an output pulse which is a hypothetical echo back to the transducer indicative to water depth and wave motion.

Figure 3:
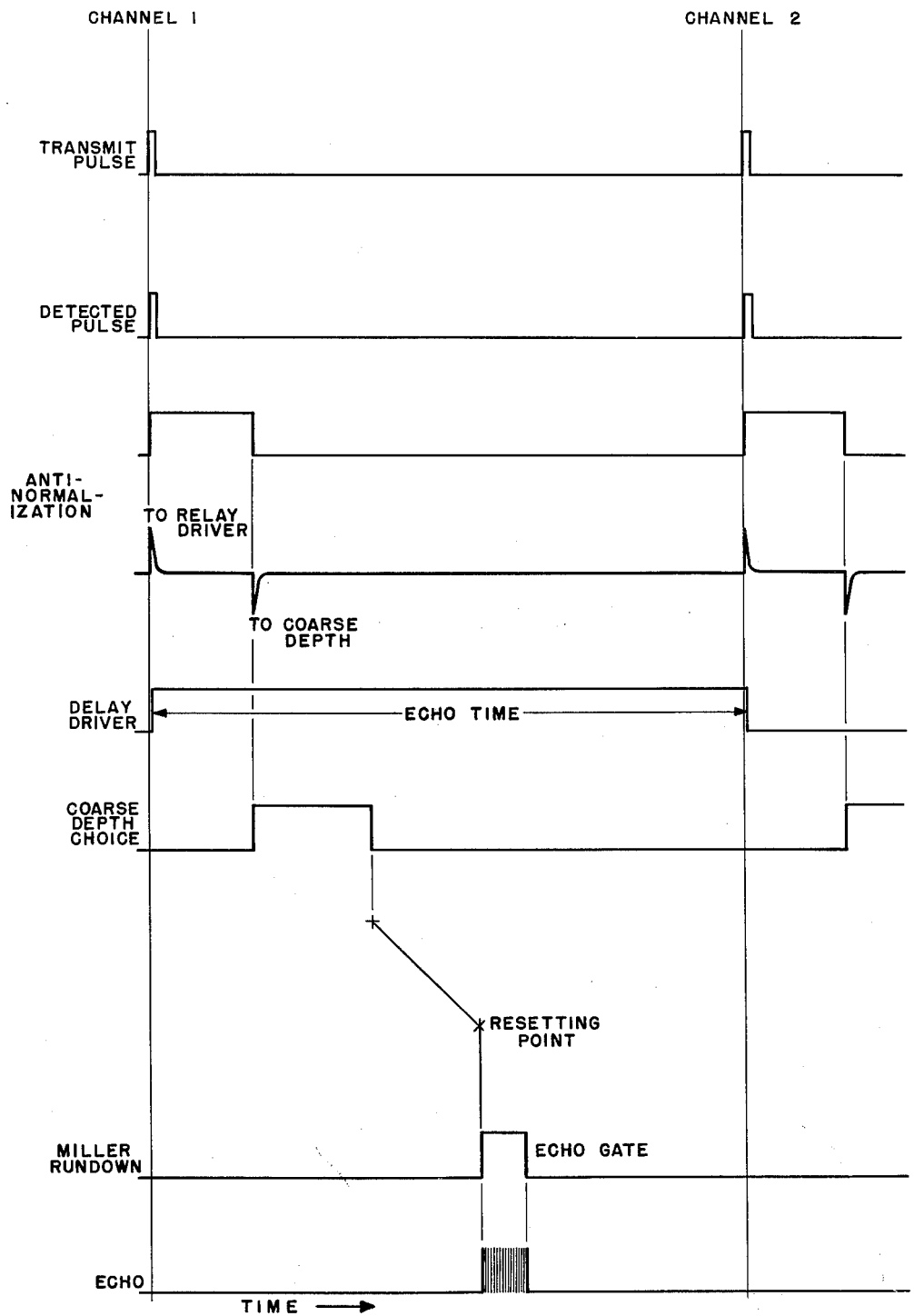

Other objects, advantages and novel features of the invention will become apparent from the following detailed description of the invention when considered in conjunction with the accompanying drawings wherein:

FIG. 1 is a block diagram of the transponder system;

FIGS. 2a–g are detailed drawings of the transponder system showing circuit diagrams of certain parts of the system;

FIG. 3 is a timeline chart showing the relationship of the various signals within the system from the transmit pulse to the echo pulse.

Reference is now made to FIG. 1 wherein is shown a block diagram of the present transponder system. A plurality of inputs 100 are provided into the transponder system. These inputs simulate a plurality of transducer channels which, in practice, are energized by a water condition computer. Each input has connected thereto a sampling resistor 101 to sample the input interrogating pulse to the system which is a hypothetical transducer actuating pulse from the water condition computing system. These sampling resistors 101 provide an input signal to a detector and anti-normalization circuit 102, each of these circuits 102 being designed to simulate a transducer located in a predetermined point on a submarine. The purpose of the anti-normalization circuits is to simulate a transducer which is located at a predetermined point on a submarine rather than on the normalization line for the system. It should be noted that, in general, a water characteristic sensing system incorporates a normalization system to compensate for varying relative depths of the transducers. This normalization system adjusts the effective depth of each of the transducers to a predetermined common depth such as the keel line of the ship. Since the condition sensing system utilized in conjunction with the present transponder system generally incorporates normalization means, the anti-normalization circuits 102 are necessary to simulate differences in hypothetical transducer depths. In order to simulate transducers located at the same depths on a submarine, a plurality of inputs 106 connected in parallel are provided to a special detector and common anti-normalization circuit 103 which will be hereinafter more particularly described. In general, the purpose of this circuit is to eliminate cross-talk between inactive channels due to the increased capacitance of the inputs connected in parallel when another channel is activated. Each of the several detector and anti-normalization circuits 102 and 103 are connected at their outputs to an "OR" gate 104. The purpose of "OR" gate 104 is to provide a common output from the detector and anti-normalization circuits 102 and 103 upon excitation of each in sequence.

It should be noted that the means for sequentially exciting each transducer channel is provided in the condition computing system itself and is not a part of the present invention. For purposes of the present invention any system having a normalization means which is capable of exciting the transducer channels in sequence and receiving echo pulses could be utilized.

"OR" gate 104 is connected to transmit-receive relay driver 105 which in turn actuates a switch arm 107 to connect the inputs of the transducer channels 100 and 106 to either dummy load 108 or pulse amplifier 109. As shown in FIG. 1, the transducer channels are connected to pulse amplifier 109, which is the receive mode of operation of the system. In its original transmit condition, i.e., when the hypothetical transducers are in position to receive interrogating pulses, switch arm 107 is connected to dummy load 108 to simulate a normal load presented to the transducers.

As will be hereinatfer more particularly described, the output of each detector and anti-normalization circuit 102 is a pulse. The leading edge of this pulse is adapted to actuate transmit and receive relay driver 105 and the trailing edge of the pulse actuates the coarse depth simulator circuits, A, B, or C. These circuits are connected to "OR" gate 104 by a switch 111 which may be positioned to contact any of the three course depth simulators. The purpose of a plurality of coarse depth simulators is to indicate a variety of depths, any one of which may be selected by positioning the switch 111. Coarse depth simulator C is nothing more than a short circuit, and will impose no delay in the echo simulating system. The coarse depth simulator is connected to a special resetting Sanotron 112, this circuit being designed to provide a fine depth delay in the echo system, and is acted upon by signals from a low frequency oscillator 114 and a noise generator 115 which signals are mixed in mixer 116 to indicate wave motion and noise factors which would be present in any practical system. Mixer 116 is acted upon by a fine depth control 123, and provides amplitude modulation to gated amplifier 118 which amplifier receives an RF carrier signal from oscillator 119. The output of Sanotron 112 is gated to coarse depth attenuator through gate circuit 117. RF oscillator 119 provides the basic signal which is passed through gated amplifier 118 to coarse depth attenuator 121, fine depth attenuator 122 which is mechanically adjustable by fine depth control 123, to pulse amplifier 109 and thence to the computer system through inputs 100.

As has been previously mentioned, each of the transducer channels are provided with a separate detector and anti-normalization circuit 102 except in cases where the simulated transducers are located, hypothetically, at the same datum levels with respect to the normalization level of the system. The reason for providing separate indicator and anti-normalization circuits for each channel is that each anti-normalization circuit should be designed to simulate transducers located at different levels with respect to the normalization level of the system. In cases where the simulated transducers are located at the same levels, it is desirable to connect each input 106 in parallel with a single detector and a common anti-normalization circuit. It may be appreciated that although each channel is connected in sequence to transmit and receive information, the capacitance of the disconnected channels will cause a certain amount of cross-talk to a signal incoming on the connected channel. As will be more clearly pointed out later, the output signal of each detector circuit 102a is a spike pulse. This pulse is used to trigger the anti-normalization circuitry 102b which circuitry is designed to be actuated only when the spike pulse reaches a predetermined level of amplitude. As can be seen by reference to the output of the detector circuit 102a in FIG. 2a, the echo pulses due to the single capacitance feedback from disconnected channels are not of sufficient magnitude to trigger the anti-normalization delay circuits 102b. However, the parallel connected common depth transducers having common inputs 106 will have a combined additive effect and provide cross-talk pulses of sufficient magnitude to interfere with the operation of the anti-normalization delay circuitry. Thus, it is necessary to provide a special circuit for eliminating the combined capacitance effect of the parallel connected circuits. This special circuitry is the subject matter of application Serial Number 274,877 filed April 22, 1963 by Samuel Wolf and Roy C. Robley, Jr.

Referring now to FIGS. 2a through 2g, there is shown a more detailed drawing, partially in block and partially in schematic, of the transponder system of the present invention. Since several of the circuits are duplicated for the multiplicity of input channels, only a single circuit will be described where appropriate. As may be seen in FIG. 2a, the single input channels 100 and multiple input channels 106 are connected into the detector circuits 102a and 103a, respectively. For simplicity only a single detector circuit 102a will be described in detail and the corresponding detector circuits for single input channels are merely shown in block form.

Figure 2B:
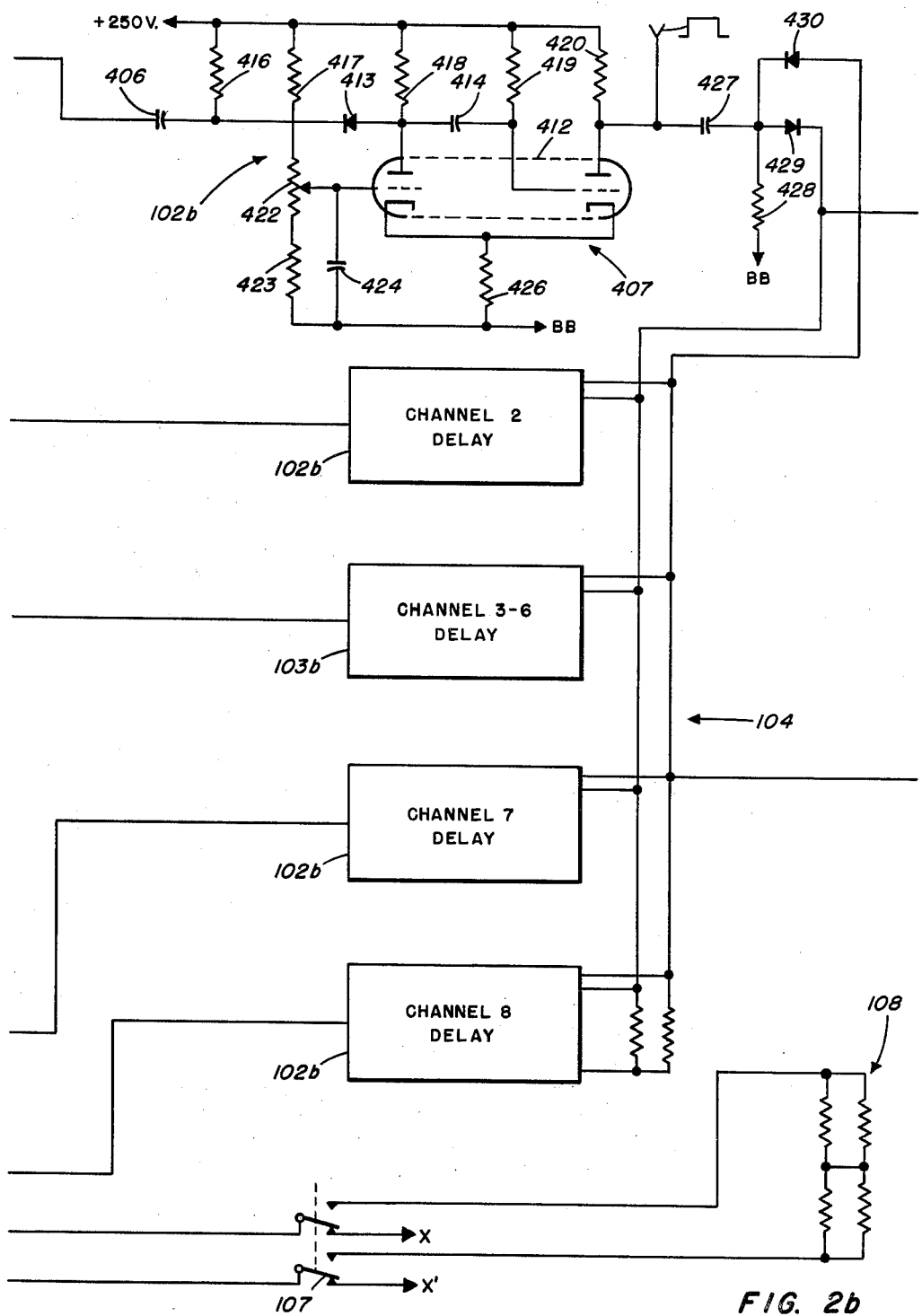

As shown in FIG. 2a, the input 100 to the transducer channels are coupled to a pair of sampling resistors 400 each located on one side of the input. The reason for providing a sampling resistor 400 and a detector circuit 102a on each side of the line is to provide a balanced circuit. Sampling resistors 400 are designed to provide a voltage drop indicative of the input to the channel. This voltage signal is coupled to a transformer 401 having a primary and secondary winding. The secondary winding of transformer 401 is coupled through diode 402 and capacitor 404 to the input of anti-normalization delay circuit 102b through line 405 and capacitor 406 (FIG. 2b). The anti-normalization circuits 102b are designed to provide a delayed output signal and is a standard multi-vibrator circuit. The inputs 100 and 106 are connected via lines 410 and 411 shown in FIG. 2a to a dummy load 108 through switch arms 107 shown in FIG. 2b when the transducer system is in the transmit mode of operation, i.e., when the transducers are hypothetically adapted to be energized by an interrogation pulse. Upon actuation of the relay driver 105 by an output pulse from one of the anti-normalization circuits 102b in a manner hereinafter to be more particularly described, relay driver 105 will be de-energized to allow switch arms 107 to move the receive mode of operation to allow a simulated echo pulse to be returned through inputs 100 to the water characteristics computer system.

Referring again to anti-normalization circuits 102b shown in FIG. 2b, it may be seen that these circuits are comprised of multi-vibrator 407 comprising a dual triode 412 having the plate of one triode connected through capacitor 406 and diode 413 to the detector circuit 102a. The grid of the second triode is connected to the plate of the first triode through capacitor 414. Resistors 416 through 420 are standard multi-vibrator circuitry to provide the proper bias and switching action of the multi-vibrator 407. A voltage divider comprising resistor 417, potentiometer 422 and resistor 423 provides the bias to the grid of one of the triodes. Capacitor 424 provides the A.C. bypass for the grid of one of the triodes. Resistor 426 provides the cathode potential for the multi-vibrator tubes.

The output of detector 102a or 103a, when one of these is actuated in sequence, provides a negative going pulse to the input of the multi-vibrator 407. This pulse is shown in FIG. 2a. As may be seen by reference to this signal, a small amount of cross-talk due to the input capacitance of the various circuits causes a number of "ghost" pulses of small amplitude. It is noted, however, that these cross-talk pulses are of insufficient amplitude to trigger the multi-vibrators 407. However, in the multiple, parallel connected channels 106, the cross-talk signals may achieve sufficient amplitude to trigger the multi-vibrator and thus interefere with the proper operation of the circuit. A special detector circuit, previously referred to, must be provided if multiple parallel connected channels are desired.

As can be seen by reference to FIG. 2b, the input trigger signal to any of multi-vibrators 407 results in an output signal which is a square wave pulse. The relationship of this pulse, which is referred to as a delayed signal, to the trigger pulse may be seen by reference to the time-line chart shown in FIG. 3. The delay pulse from the output of each anti-normalization circuit 102b simulates a variation in the depth of the hypothetical transducers from the normalization line of the system. This signal is RC coupled to relay driver 105 through an integrator comprising capacitor 427 and resistor 428 and a diode 429. As may be seen by reference to the drawings, FIG. 2c, the output signal of integrator is a fast rising pulse. This pulse is coupled to relay driver 105 by capacitor 431 and resistor 432 to provide a bias to triode 433. Diode 435 provides a bypass for the input to triode 433. Upon actuation of triode 433, the square wave output at its plate is coupled through the parallel combination of capacitor 436 and resistor 437 to the grid of one of the dual triodes of switching circuit 438. Switching circuit 438 is a standard circuit and will not be described in detail. It is seen, however, that energization of the circuit provides a positive output pulse which is coupled through the parallel combination of capacitor 439 and resistor 440 to cathode follower 442. This positive pulse provides a bias to the grid of cathode follower 442 which in turn begins to conduct and generates a voltage drop across cathode resistor 443 of the same duration as the input pulse. This voltage drop is coupled through resistor 444 to the base of a transistor 445 which is provided with an overload protection diode 446 connected to a bias potential. Receipt of the positive pulse at the base of transistor 445 biases it to cut-off to thereby open the circuit from the power supply 441 as shown in FIG. 2d through the relay coil 447 of the reset switching circuit to thereby de-energize the relay and relay and release switch arm 107 as has been hereinbefore described. Diode 448 provides protection for relay coil 447. Power supply 441 is a standard power supply and is shown only in block form.

As has been previously mentioned, the outputs of the anti-normalization circuits 102b are fed to the relay driver 105 and the coarse depth circuit 111 through diodes 429 and 430, respectively. By reference to FIG. 2b it can be seen that the polarity of diode 429 enables only the leading edge or positive portion of the delayed pulse to pass into the relay driver circuit 105. On the other hand, diode 430 transfers the trailing edges or the negative portion of the pulse to the input of the coarse depth delay circuitry 111. As shown in the drawings, coarse depth delay circuit 111 has three separate delay times which may be selected by positioning a switch. These three delay times are indicated by contacts A, B, and C on the input and output portions of the circuit. Contact A provides access to a delay multi-vibrator 449, contact B provides an input to delay multi-vibrator 450, and contact C provides an input to a standard transmission line which incorporates no delay into the circuit. Delay multi-vibrators 449 and 450 are standard multi-vibrator circuits, and further description is not deemed necessary to an understanding of the present device. It need only be mentioned that each circuit may be adjusted or designed to provide a predetermined delay signal.

Figure 2E:
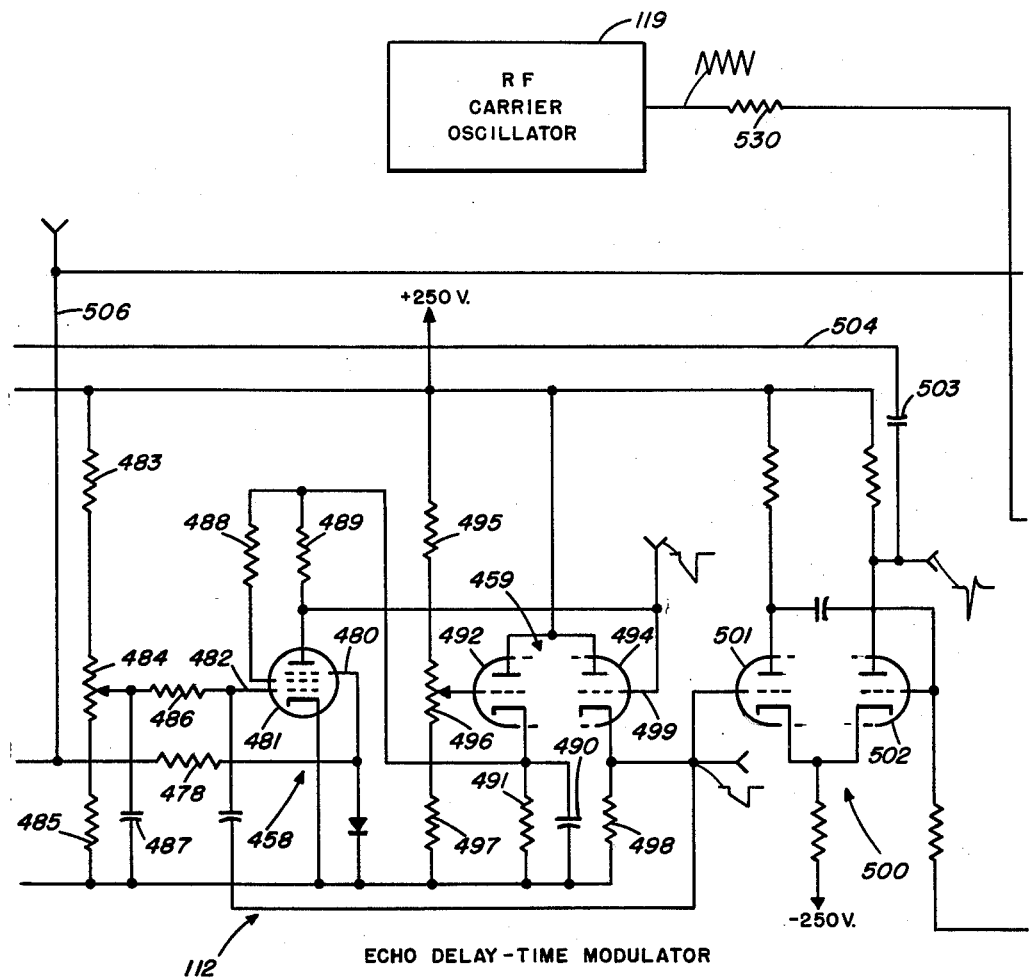
Figure 2F:
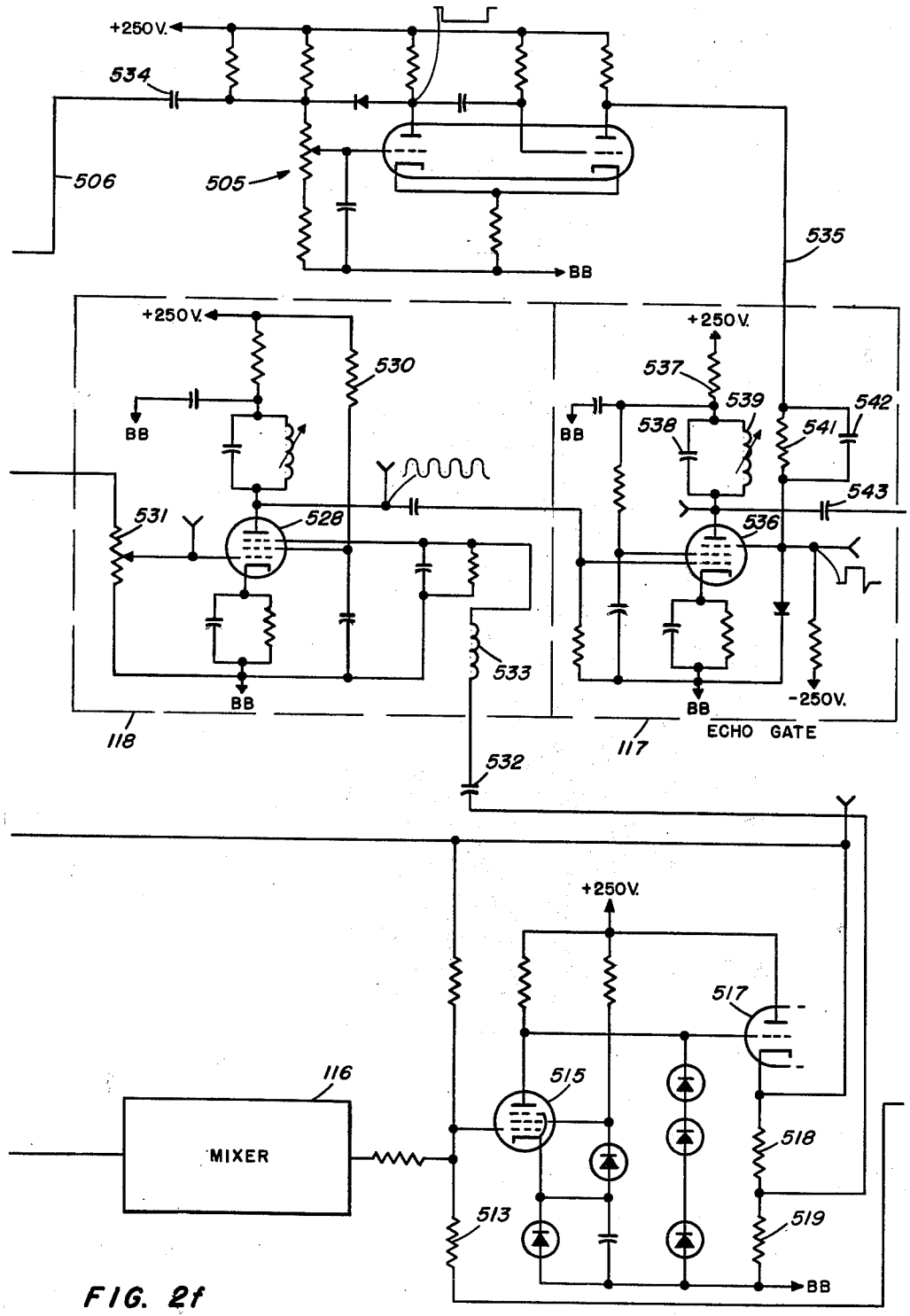

The output of the coarse delay circuit 111 is a square wave pulse as shown in FIG. 2c and is coupled into an echo delay time modulator 112, termed a special resetting Sanotron, shown in FIGS. 2d and 2e, which provides a fine adjustment on the time delay for the simulated echo pulse. Echo delay time modulator 452 includes a run-down gate generator 454 comprising a reset pentode tube 455 and a dual triode switching tube 456. A Miller run-down circuit 458 actuates a dual triode switching circuit 459 which is cathode connected to the grid of one triode of a dual triode comparator circuit 500. The output of coarse depth delay circuit 451 is coupled to the echo delay time modulator 452 through a capacitor 462 which couples the signal through diode 463 to the plate of resetting pentode 455 and thence to the grid 464 of first triode 465 of the dual triode switching circuit 456. The plate of the first triode 465 is coupled to the grid 467 of second triode 468 through the parallel combination of resistor 470 and capacitor 471. The supply voltage for the pentode and the triode switching circuit is supplied through resistors 472, 473, 474, 475, and 476. Dual triode switching circuit 456 is cathode connected to the suppressor grid 480 of pentode 481 which is the tube for the Miller rundown circuit 458. It should be noted that resistor 477 provides the voltage drop in the cathode circuit of triode 468 which is coupled to the Miller run-down generator 458. The grid bias for the run-down circuit 458 is obtained from resistor 483, potentiometer 484, and resistor 485 through dropping resistor 486. Capacitor 487 provides A.C. coupling to the supply voltage. The screen grid of pentode 481 is biased through resistor 488 to the cathode of triode 492 of the dual triode 493. Resistor 491 in the cathode circuit provides the voltage drop, while capacitor 490 provides the A.C. bypass for the cathode of triode 492. Resisotr 489 which is coupled to the cathode of triode 492 provides the plate supply for pentode 481. The output of Miller run-down 458 is connected to the grid 499 of triode 494 of the dual triode switching circuit 459. The dual triode 459 is cathode coupled to comparator 500 by resistors 497 and 498 for triodes 492 and 494, respectively. Dual triodes 501 and 502 provide a comparator circuit for comparing the output voltage of the run-down circuit with a reference voltage. As can be seen by reference to the drawing, FIG. 2e, the output of comparator circuit 500 is coupled through capacitor 503 and lead 504 to the suppressor grid of reset pentode 455. This feature of the present invention is of the utmost importance to the device since the output spike pulse of the comparator circuit 500 actuates pentode 455 which causes the output signal to reset dual triode switching circuit 456 and thus provide an output pulse. This output signal is coupled through lead 506 to an echo width pulser 505, shown in FIG. 2f, which will be hereinafter more particularly described.

A variation of the reference voltage for comparator circuit 500 is obtained by means of function generators 114a, shown in FIG. 2c, and 114b, shown in FIG. 2d, along with noise generator 115, shown in FIG. 2e. These signals are mixed in mixer 116, shown in FIG. 2f, and are coupled to comparator circuit 500 to cause a variation of the reference voltage and thus a variation of the depth simulation of the echo pulse. It should be pointed out that the Miller run-down generator 458 is reset by switching circuit 456 and reset pentode 455. The reset signal issues from comparator 500 when the reference voltage and the voltage of the run-down generator are equal. By adjusting the reference voltage, control of the level of the fine depth adjustment is obtained. It is readily apparent, therefore, that function generators 114a and 114b, and noise generator 115, provide a simulated varying depth for the echo pulse which may be indicative of water surface motion. A typical example of function generators would be a pair of sine wave generators indicating fore-aft and port-starboard wave motion. However, any desirable function generators could be used in the present invention.

Figure 2G:
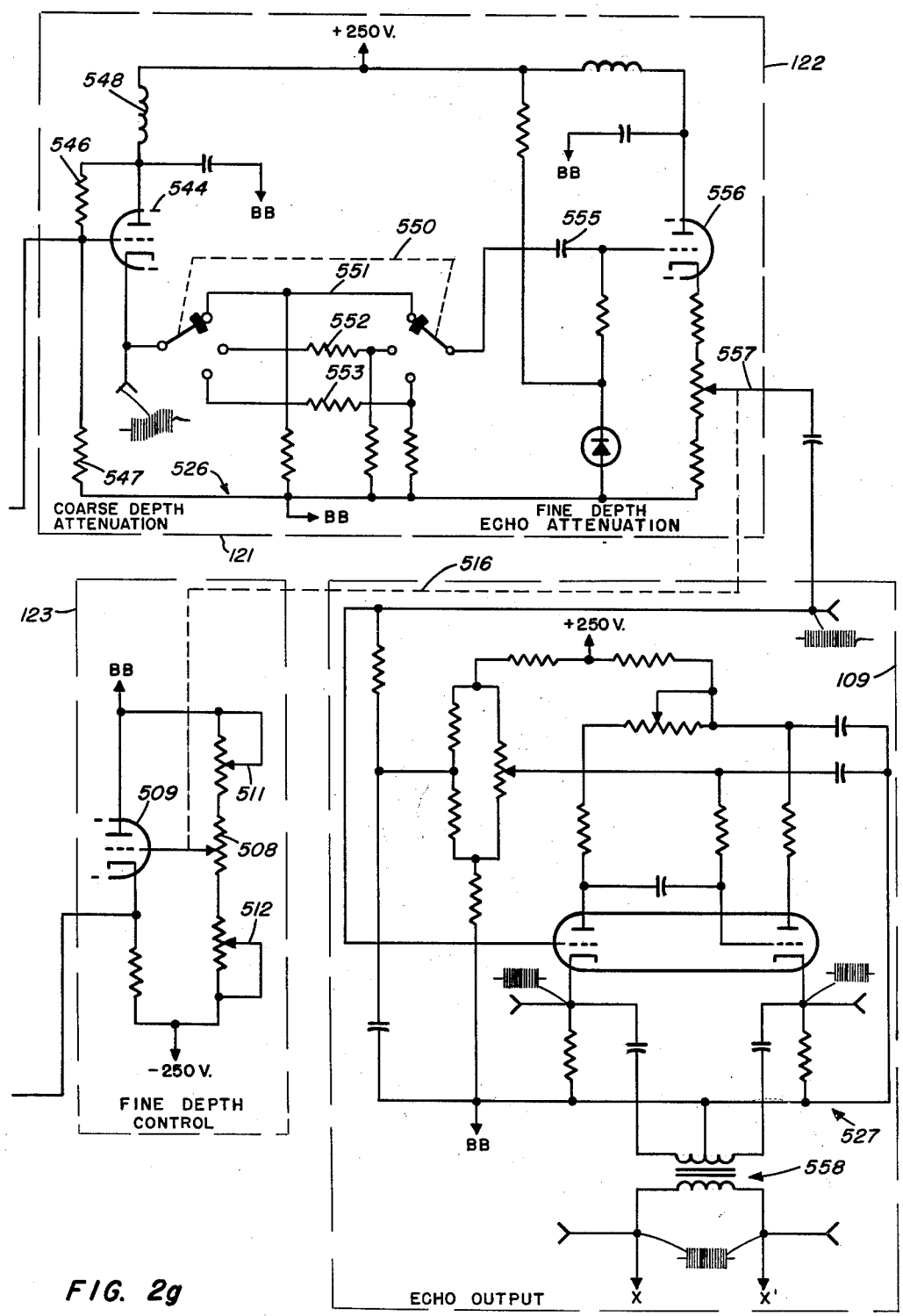

The fine depth control of the present invention is obtained through fine depth control mechanism 123 shown in FIG. 2g which comprises a triode circuit having a bias provided by a variable potentiometer 508 coupled to the grid of the triode 509. Further fine adjustment of the bias to the tube may be obtained through potentiometers 511 and 512. The cathode of triode 509 is coupled through resistor 513 to the grid of pentode 515 shown in FIG. 2f. It should be noted that the grid of pentode 515 is further biased by the output of function generators 114 and 115 connected through mixer 116. The amplification of this reference voltage is controlled initially by fine depth control 509. A mechanical linkage 516 insures that the fine depth adjustment of the echo attenuator 122 is the same as that of the fine depth control 123. The output of pentode 515 is amplified by triode 517 and is cathode coupled through connector 518 to the triode 502 of comparator 500 shown in FIG. 2e. This signal, along with the bias signal from the fine depth control circuit 123, provides the reference voltage for the comparator 500. Resistors 518 and 519 provide the cathode connection to the supply circuit for triode 517, and provide a voltage divider for the connection of the output of the cathode circuit of triode 517 through connector 519 to the suppressor grid of pentode 528 of gated amplifier 118.

The passage of the echo pulse and the circuitry for determining its characteristics will now be described. The basic echo pulse is an RF signal supplied by oscillator 119 shown in FIG. 2e. This pulse is coupled to the output circuit at the proper time through a gated amplifier 118, an echo gate 117, an echo attenuator 122, and an echo amplifier 109. Gated amplifier 118, shown in FIG. 2f, comprises a pentode 528 having its input grid connected to RF oscillator 119 through resistor 530 and variable potentiometer 531. The screen grid of pentode 528 is connected to the supply voltage through resistor 530, and the suppressor grid is biased by the output of the fine depth tuning circuit through capacitor 532 and inductor 533. The output of gated amplifier 118 is RC coupled to echo gate 117. Echo gate 117 displays an open circuit to the output signal of gated amplifier 118 until the gate is opened by a signal from echo width pulser 505 which in turn is actuated by the reset signal from the echo delay time modulator 112. Echo width pulser 505 is a standard multivibrator circuit and is coupled through capacitor 534 and lead 506 to the cathode circuit of triode 468 in the dual triode switching circuit 456. Upon resetting of the switching circuit 456, the pulse is coupled to echo width pulser 505 to cause the switching circuit to be actuated and to generate a negative signal which is coupled through lead 535 to the suppressor grid of pentode 536 in echo gate 117. The output signal from echo width pulser 505 when coupled to the suppressor grid of pentode 536 biases the pentode to conduct and, thus, pass the output of pulse amplifier 118 to the input of echo attenuator 122. The plate supply voltage of pentode 536 is provided through resistor 537 and the parallel tank circuit comprising capacitor 538 and variable inductor 539. Resistor 541 and capacitor 542 provide coupling for the output signal from echo width pulser 505 to the suppressor grid of pentode 536.

The RF output of echo gate 117 is RC coupled through capacitor 543 and resistor 547, shown in FIG. 2g, to the echo attenuator 122 having a coarse depth attenuation connected to cathode follower 544 and a fine depth attenuation connected to cathode follower 556. The plate of triode 544 is connected to the grid through resistor 546. Inductor 548 connects the plate of triode 544 to the plate supply voltage. The coarse depth attenuation of the cathode signal is achieved through a series of voltage dividers, any one of which may be selected according to the desired attenuation of the cathode signal to indicate depth attenuation for the echo signal. Switch 550 is designed to contact voltage dividers 551, 552, or 553, which voltage dividers will provide different amounts of attenuation for the output signal. This attenuated signal is connected to the fine depth attenuator consisting of triode 556 and cathode potentiometer 557, through capacitor 555. The potentiometer 557 is connected by a mechanical linkage 516 to the fine depth control circuit 123 which has has been previously described in connection with the fine depth control of comparator 500 in the echo delay time modulation circuit. This mechanical linkage insures that the fine depth time delay of the echo signal corresponds with the attenuation of the signal to simulate a predetermined depth of the tranducer being interrogated.

The RF echo pulse output of attenuator 122 is coupled to the pulse amplifier 109 through an RC coupling circuit. The pulse amplifier circuit 109 may be any suitable amplifier circuit. A dual triode circuit wherein the output pulse signal is obtained from either of the cathodes of the triodes and coupled to the output through a transformer 558 is shown. As may be seen by reference to the drawings, FIG. 2g, the echo output signal is a RF pulse of time delay determined by the interaction of the echo delay time modulation circuit, the echo width pulser, whose period of operation is determined by the resetting point on the Sanatron circuit and the echo gate circuit. The amplitude of the RF pulse is determined by the interaction of the coarse and fine depth attenuation circuits along with the pulse amplifier. As has been previously discussed, the echo output is coupled back through the hypothetical transducer circuit at the detector input, and thence transmitted to the utilization circuit which may be a water characteristic computer. The circuit described provides an echo pulse which is of a predetermined amplitude and time delay indicative of the surface characteristic of a hypothetical body of water proximate to the transducer outward. This type of simulator may be called a surface scanner transponder.

Reference may be made to the drawings, particularly FIG. 3 along with the detailed schematic in FIGS. 2, a through g, for the operation of the present invention. As has been previously mentioned, each of the transducer inputs 100 and 106 are connected separately in sequence to a utilization circuit such as a water characteristic computer. In normal operation, i.e., where a typical transducer system on a submarine is operated, each transducer is excited by the utilization circuit and transmits a RF pulse which is reflected from the surface of the water and is received back into the transducer and thence transmitted to the utilization circuit to indicate the surface characteristic of the water.

The present device simulates such action by a hypothetical surface scanner circuit. Each input 100 or 106 in the case of transducers located at common depth, is interrogated by a transmit pulse which is detected by sampling resistors 400 and is coupled to an anti-normalization circuit 102b from a detector 102a. The input to each of the antinormalization circuits 102b is a spike pulse. As has been previously mentioned, the input capacitance of the disconnected inputs will cause a certain amount of cross-talk and in the case of a multiplicity of parallel connected inputs, the cross-talk reaches sufficient magnitude that a special detection circuit must be provided to eliminate the cross-talk. As shown in FIG. 2b, the excitation of an anti-normalization circuit 102b actuates a multi-vibrator circuit 407 which provides an output pulse indicative of a delay in the transmit pulse due to a variation in the relative location of the respective transducer. This output pulse is differentiated and the leading edge, which occurs almost simultaneously with the transmit pulse, is applied to the relay driver 105 which de-activates relay coil 447 to switch arm 107 from dummy load 108 to its receive mode to be in position to receive simulated echo pulse. As may be seen by reference to FIG. 3, relay driver 105 de-activates relay coil 447 for a sufficiently long time to allow the entire simulated echo operation to transpire. The trailing edge of the anti-normalization pulse is applied through the "OR" circuitry to coarse depth delay circuit 111 which circuit delays the output pulse a predetermined length of time depending upon the delay circuit, to indicate roughly the depth of the transducer beneath the surface of the water. The coarse depth output signal is connected to the echo delay time modulator 112 which is designed to provide fine depth delay from the echo signal. This fine depth delay is achieved through the action of a Miller run-down 453 which is actuated by a rundown gate generator 454 and is applied to a comparator circuit 500. The comparator circuit 500 is supplied with a reference voltage which is modulated to indicate surface motion of water. The Miller run-down 458 generates a linear signal with amplitude decreasing with time until the rundown output voltage is equal to the comparator reference voltage. At this time a reset signal is emitted from the comparator 500 to reset the circuit. The reset signal actuates switching circuit 456 which circut emits a pulse which is coupled through line 506 to echo width pulser 505. The length of the pulse into echo width pulser determines the time duration of the output pulse from echo width pulser since this circuit is a standard multi-vibrator circuit. The output of echo width pulser 505 is coupled to the suppressor grid of the pentode in echo gate 117. The signal biases pentode 536 to conduct. A gated amplifier 118 is connected to echo gate 117 and is provided with an RF signal which is to be used as a simulated echo pulse. This RF signal is coupled to gated amplifier 118, but will not pass to the attenuation circuit 122 except during the time that echo gate 117 is conducting. Therefore, the length of time that echo gate 117 is open due to the action of echo width pulser 505 which in turn is actuated by the re-setting Sanatron or echo delay time modulator 112.

The RF signal which passes through echo gate 117 is attenuated by a coarse attenuator 121 and a fine attenuator 123 in the echo attenuation circuit 122. This circuit is adjusted by means of coarse attenuation switch 550 and fine attenuation potentiometer 557 to limit the amplitude of the echo pulse to correspond with the depth that has been previously determined by the time delay circuitry. Thus, the echo pulse from the echo attenuation circuit 122 is of a time duration and magnitude indicative of a predetermined surface condition of the water being scanned. The attenuated signal is coupled into a pulse amplifier 109 and thence through a transformer 558 to the echo output circuit. As may be seen by reference to the block diagram of FIG. 1, switch arm 107 has been positioned to connect pulse amplifier 109 to the detector circuits of the transducer channels 100 so that the proper echo pulse is coupled to the utilization circuit.

It may be seen that the present invention provides a surface scanner transponder system for providing an RF echo pulse to a utilization circuit which is indicative of a predetermined hypothetical surface condition. This signal may be utilized in many different applications such as for teaching or demonstration.

Obviously many modifications and variations of the present invention are possible in the light of the above teachings. It is therefore to be understood that within the scope of the appended claims the invention may be practiced otherwise than as specifically described.

What is claimed is:
1. In a sonar surface scanner transponder system, the combination comprising;
   a plurality of signal receiving means simulating transducer channels, each receiving means being adapted to be actuated in sequence by an interrogation signal from a utilization means;
   a plurality of detection means and anti-normalization means, one being connected to each of said signal receiving means for detecting, delaying and transmitting an interrogation signal to an echo simulating system;
   each of said detection means being electrically connected to one of said plurality of signal receiving means, and each of said anti-normalization means being electrically connected in series with the output of one of said detection means;
   switch means connecting each of said plurality of signal receiving means alternatively to a dummy load or simulated echo output circuit in response to an output signal from said anti-normalization means; and
   echo simulating means actuated by an output signal from said anti-normalization means for generating an electrical pulse of a predetermined magnitude and time delay indicative of a hypothetical surface condition of a body of water, whereby the generated simulated echo signal is transmitted from said echo simulating means, through one of said signal receiving means to a utilization means.

2. A system such as that defined in claim 1 wherein;
each of said anti-normalization means includes a multivibrator circuit for generating a time delayed pulse simulating a time lag in the simulated transducer to which it is connected representing a particular height of the simulated transducer relative to the normalization line of the system.

3. A system such as that defined in claim 2 wherein;
the signal receiving means to each of said simulated transducer channels comprises two transmission lines;
said detection means comprising a resistance in series with each of said transmission lines and a transformer adapted to be actuated by the voltage across said resistance means to provide an output from said detection means.

4. A system such as that defined in claim 3 including;
an "OR" gate connected to the outputs of the plurality of anti-normalization means for transmitting the output signal thereof to the echo simulating means.

5. A system such as that defined in claim 4 including;
a relay driver connected to said "OR" gate and actuated by an output signal from said anti-normalization means; and
relay means actuated by said relay driver means for positioning said switch means to connect said plurality of signal receiving means to said dummy load prior to receipt of a signal from said anti-normalization means in said relay driver.

6. A system such as that defined in claim 5 wherein said echo simulating means comprises;
coarse depth delay means connected to said "OR" gate for generating a signal delayed in time an amount approximately equal to the time delay of an echo traveling a predetermined distance from said simulated transducer channels;
said coarse depth delay means being selectively variable to simulate a multiplicity of depths;
fine depth delay means coupled in series with the output of said coarse depth delay means for achieving an accurate time delay of said echo signal to indicate the simulated depth of said plurality of simulated transducer channels;
said fine depth delay means including a variable adjustment means for simulating wave motion;
said fine depth delay means including a signal means for indicating when the echo signal has been delayed a desired length of time to simulate a predetermined depth of said plurality of simulated transducers;
oscillator means for generating an electrical signal to be utilized as an echo pulse;
echo width pulsing means adapted to be actuated by said signal means for determining the time duration of the echo pulse from said oscillator means;
gate means electrically connected to the output of said echo width pulsing means and adapted to be actuated thereby for enabling transmission of the echo pulse only during the period of actuation of said echo width pulser;
attenuator means electrically connected to the output of said gate means for attenuating the echo signal from said oscillator means in accordance with a predetermined depth; and
output means including pulse amplifier means connected to said attenuator means for providing an output path for the echo pulse from said attenuator means to one of said plurality of transducer channels so that the echo pulse may be transferred to the utilization means.

7. A system such as that defined in claim 6 wherein said fine depth delay means comprises;
a run-down generator for generating an electrical signal which decreases linearly in magnitude with time;
trigger means having an input and an output;

said input being electrically connected to said coarse depth delay circuit, and said output being electrically connected to the input of said run-down generator for actuating said run-down generator upon receipt of a signal from said coarse depth delay means;

comparator means connected to the output of said run-down generator means;

said comparator means having a reference voltage for comparison with the signal from said run-down generator means and being adapted to generate an electrical signal when the output of said run-down generator equals the reference voltage; and reset means connected to the output of said comparator means for resetting said run-down generator to thereby activate said echo width pulse means when the output of said run-down generator equals the reference voltage of said comparator means.

8. A system such as that defined in claim 7 including;
electrical function generating means having an output signal electrically connected to the comparator means for super-imposing a predetermined function on said reference voltage indicative of periodic variations of the similated depth of said plurality of simulated transducers to thereby vary the delay time for the echo signal.

9. A system such as that defined in claim 8 including;
noise generating means having an output electrically connected to said comparator means for super-imposing a random signal on the reference voltage in said comparator means indicative of miscellaneous variations in the time delay of said echo signal.

10. A system such as that defined in claim 9 wherein;
said attenuator means includes a coarse depth attenuation circuit; and
a fine depth attenuation circuit.

11. In a system for simulating sonar echo signals indicating simulated water depth, the combination comprising;
coarse depth time delay means for generating a time delayed electrical signal approximately equal to the simulated water depth in response to an electrical actuation signal;
said coarse depth time delay means having an input for receiving an actuation signal; and
an output for transmitting a time delayed pulse in response to the actuation signal at the input;
fine depth time delay means electrically connected to the output of said coarse depth time delay means and adapted to be actuated by the output signal from said coarse depth time delay means for emitting a signal delayed in time with reference to the actuation of said coarse depth time delay means equal to that of said coarse depth time delay means plus an additional small amount inserted by said fine depth time delay means to thereby provide a time delay for simulated sonar echo signals substantially equal to the desired simulated water depth;
oscillator means for generating an electrical signal to be utilized as a simulated echo signal;
gate means electrically connected to the output of said oscillator for transmitting the output of said oscillator means for a predetermined length of time;

echo width pulser means electrically connected to said gate means for actuating said gate means for a predetermined length of time in response to a signal from said fine depth time delay means;

attenuator means electrically connected to the output of said gate means for reducing the magnitude of output signal from said gate means a predetermined amount in accordance with the simulated water depth; and echo pulse output means electrically connected to the output of said attenuator means for transmitting the output signal of said attenuator means to a utilization means.

12. A system such as that defined in claim 11 wherein;
said fine depth time delay means comprises;
a run-down generator for generating an electrical signal which decreases in amplitude linearly with time;
trigger means having an input and an output;
said input being electrically connected to said coarse depth time delay circuit, and
said output being electrically connected to the input of said run-down generator for actuating said run-down generator upon receipt of a signal from said coarse depth time delay means;
comparator means connected to the output of said run-down generator means;
said comparator means having a reference voltage from comparison with the signal from said run-down generator means, and being adapted to generate an electrical signal when the amplitude of the output signal from said run-down generator equals the reference voltage; and
reset means connected to the output of said comparator means for resetting said run-down generator when the amplitude of the output signal from said run-down generator equals the reference voltage to thereby actuate said echo width pulser means to open said gate means.

13. A system such as that defined in claim 12 including;
electrical function generating means having an output electrically connected to said comparator means for super-imposing a predetermined function on said reference voltage indicative of periodic variations of the simulated water depth.

14. A system such as that defined in claim 13 including;
noise generating means having an output electrically connected to said comparator means for super-imposing a random signal on the reference voltage in said comparator means indicative of miscellaneous variations in the simulated water depth.

References Cited by the Examiner
UNITED STATES PATENTS
2,717,994  9/55  Dickensen et al. _____ 328—146
3,153,770  10/64  Feistman et al. _____ 340—3

CHESTER L. JUSTUS, Primary Examiner.
MAYNARD R. WILBUR, Examiner.